United States Patent
Ye

(10) Patent No.: US 8,460,105 B2
(45) Date of Patent: Jun. 11, 2013

(54) GAME CONTROLLER THAT PIVOTS TO ALTERNATIVE FORM

(75) Inventor: Zhou Ye, Taipei (TW)

(73) Assignee: Cywee Group Limited, Tortola (VG)

( * ) Notice: Subject to any disclaimer, the term of this patent is extended or adjusted under 35 U.S.C. 154(b) by 935 days.

(21) Appl. No.: 12/155,687

(22) Filed: Jun. 9, 2008

(65) Prior Publication Data

US 2009/0082108 A1  Mar. 26, 2009

(30) Foreign Application Priority Data

Sep. 21, 2007  (TW) .............................. 96135281 A

(51) Int. Cl.
*A63F 13/00*  (2006.01)

(52) U.S. Cl.
USPC .................. 463/37; 463/36; 463/38; 463/46; 345/156; 345/157; 345/158

(58) Field of Classification Search
USPC .......................... 463/36–38, 46; 345/156–158
See application file for complete search history.

(56) References Cited

U.S. PATENT DOCUMENTS

| | | | | |
|---|---|---|---|---|
| 1,832,563 A * | 11/1931 | Kuhn | ............................. | 362/197 |
| 2,259,673 A * | 10/1941 | White | ........................... | 362/197 |
| 5,097,399 A * | 3/1992 | Gammache | ................... | 362/197 |
| 5,627,565 A * | 5/1997 | Morishita et al. | ............. | 345/158 |
| 6,257,505 B1 * | 7/2001 | Wang | ............................ | 239/526 |
| 7,653,771 B2 * | 1/2010 | Liberty | ........................ | 710/303 |
| 7,846,027 B2 * | 12/2010 | Meyer | ............................. | 463/46 |
| 2008/0042973 A1 * | 2/2008 | Zhao et al. | ..................... | 345/156 |

* cited by examiner

*Primary Examiner* — Milap Shah
*Assistant Examiner* — Lawrence Galka
(74) *Attorney, Agent, or Firm* — Ding Yu Tan

(57) ABSTRACT

An electronic game controller includes a front body, a rear body, a plurality of function keys and a rotating mechanism. The front body includes a second end surface non-orthogonal to its longitudinal axis. The rear body includes a third end surface parallel to the second end surface and non-orthogonal to the longitudinal axis of the rear body. The function keys are disposed on the front and the rear bodies. The rotating mechanism is connected with the second and the third end surfaces, that is, the front and the rear bodies are pivotally connected with each other via the rotating mechanism. Accordingly, since the rear body can rotate relative to the front body and be positioned via the rotating mechanism, the present invention can provide more than two ways of being held to enhance users' enjoyment of playing electronic games.

10 Claims, 7 Drawing Sheets

GAME CONTROLLER THAT PIVOTS TO ALTERNATIVE FORM

BACKGROUND OF THE INVENTION

1. Field of the Invention

The present invention relates to an electronic game controller, more especially to an electronic game controller which can be held by users for controlling special indicators on display pictures for electronic games.

2. Description of Related Art

A conventional electronic game controller for a game machine is generally held in both hands of a user. The user can press keys on the controller to input signals into the game machine. At present, stick-shaped controllers are designed which can be operated using only one hand.

However, with a single-handed input device it is difficult to meet the input requirements of the many existing different kinds of electronic games. In particular, a game controller providing only one way of being held cannot meet the requirements of playing all kinds of electronic games. For example, for electronic ball games, such as baseball, tennis ball and so on, the game controller should have the shape of a straight stick; for electronic shooting games, the game controller needs to be handgun-shaped, so that users have the feeling of holding a handgun. However, the game controllers described above only provide one way of being held such as a straight stick or a handgun-shaped structure, and therefore can only be used for a limited choice of interactive electronic games and sometimes cannot even make users enjoy the interactive electronic games well.

Hence, the inventors of the present invention believe that the shortcomings described above are able to be improved and finally suggest the present invention which is of a reasonable design and is an effective improvement.

SUMMARY OF THE INVENTION

A main object of the present invention is to provide an electronic game controller which can provide users with more than two ways of being held for controlling special indicators on display pictures for the electronic games in an interactive way.

To achieving the above-mentioned object, an electronic game controller in accordance with the present invention is provided. The electronic game controller includes a front body which includes a first end surface and a second end surface, the second end surface non-orthogonal to the longitudinal axis of the front body; a rear body which includes a third end surface and a fourth end surface, wherein the third end surface is parallel to the second end surface of the front body and non-orthogonal to the longitudinal axis of the rear body; a plurality of function keys which is disposed on the front body and/or the rear body; and a rotating mechanism which is connected with the second end surface of the front body and the third end surface of the rear body, wherein the front body and the second body are pivotally connected with each other via the rotating mechanism and the rear body may rotate relative to the front body and be positioned according to the rotating mechanism.

The efficacy of the present invention is as follows: the front body and the rear body are pivotally connected with each other via the rotating mechanism so that the rear body of the present invention can rotate relative to the front body to form more than two kinds of structures for being held by users, such as a straight stick or a handgun-shaped structure, for adapting for more kinds of interactive electronic games, thereby users can rotate and adjust the rear body to the easiest held position, so the present invention can meet the requirements of human engineering and enhance users' enjoyment of playing electronic games.

To further understand features and technical contents of the present invention, please refer to the following detailed description and drawings related the present invention. However, the drawings are only to be used as references and explanations, not to limit the present invention.

DETAILED DESCRIPTION OF THE PREFERRED EMBODIMENTS

Figure 1:
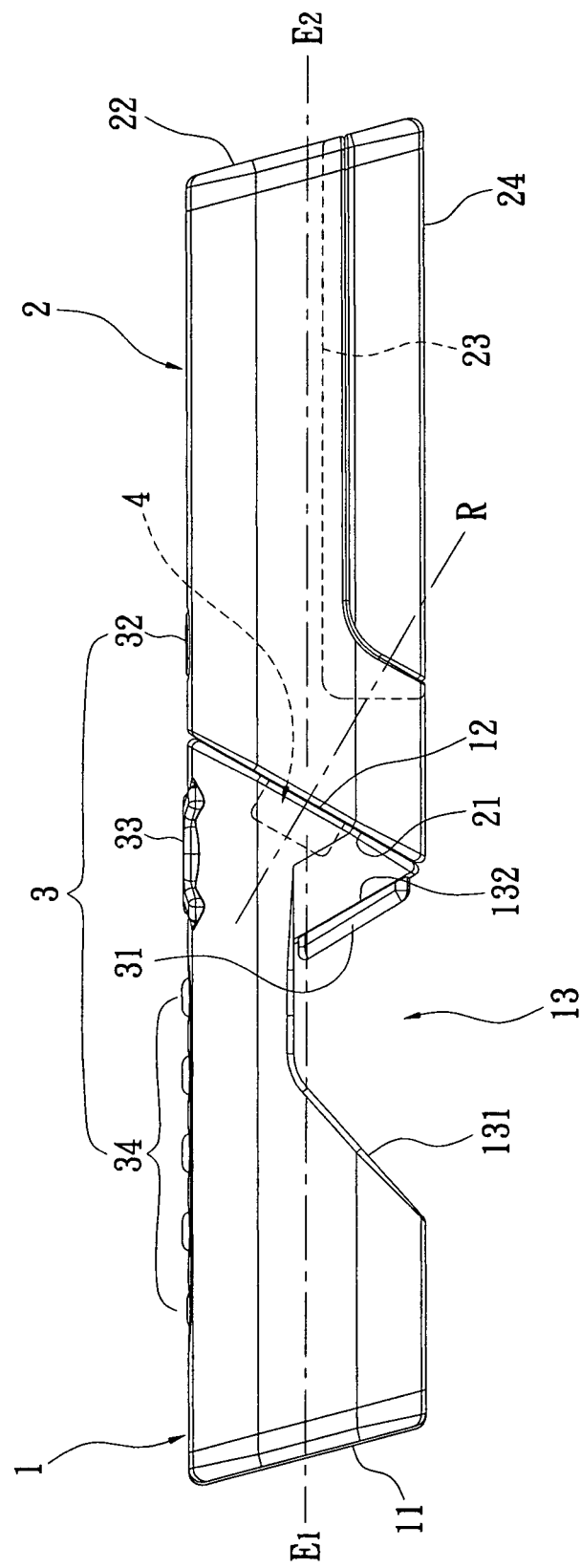
FIG. 1 is a plan view of an electronic game controller according to the present invention.
Figure 2:
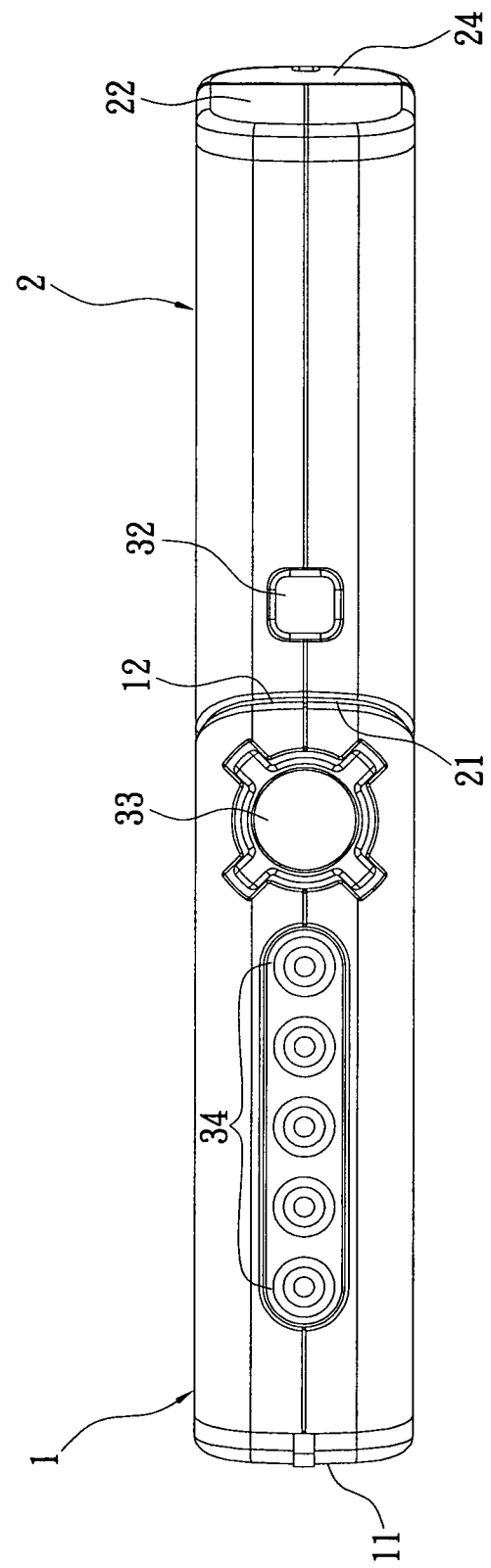
FIG. 2 is a plan view of the electronic game controller according to the present invention, from another angle.
Figure 3:
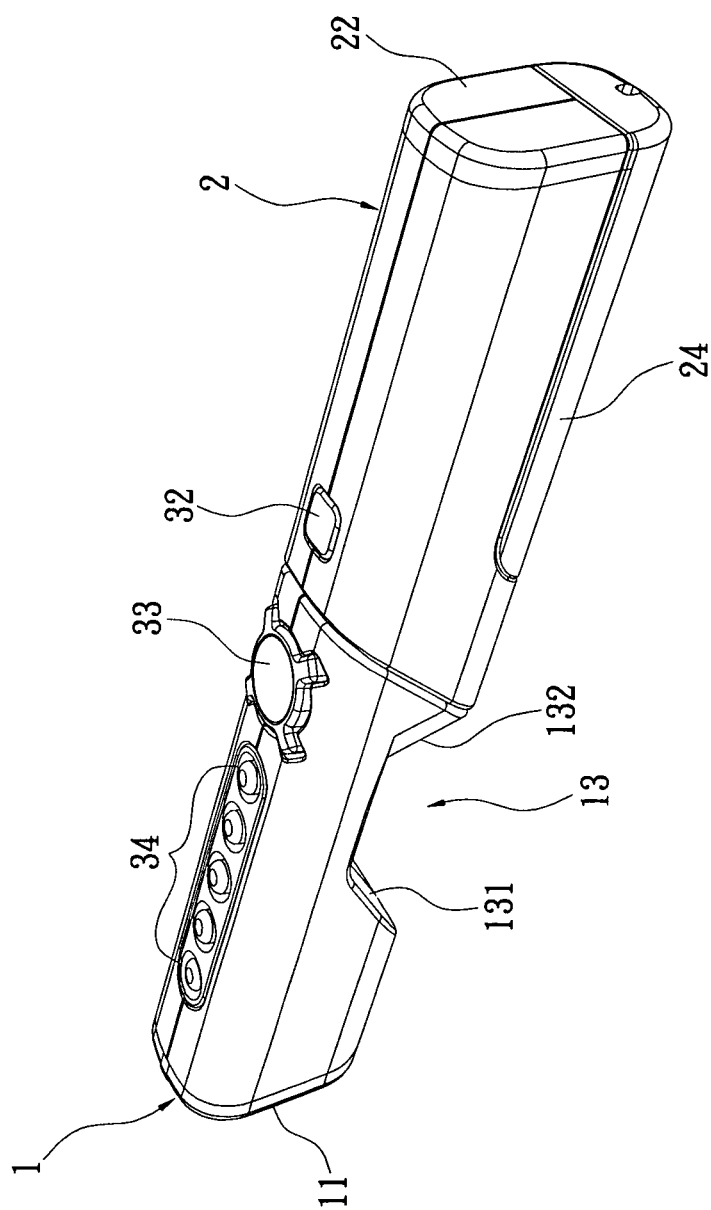
FIG. 3 is a perspective view of the electronic game controller according to the present invention.
Figure 7:
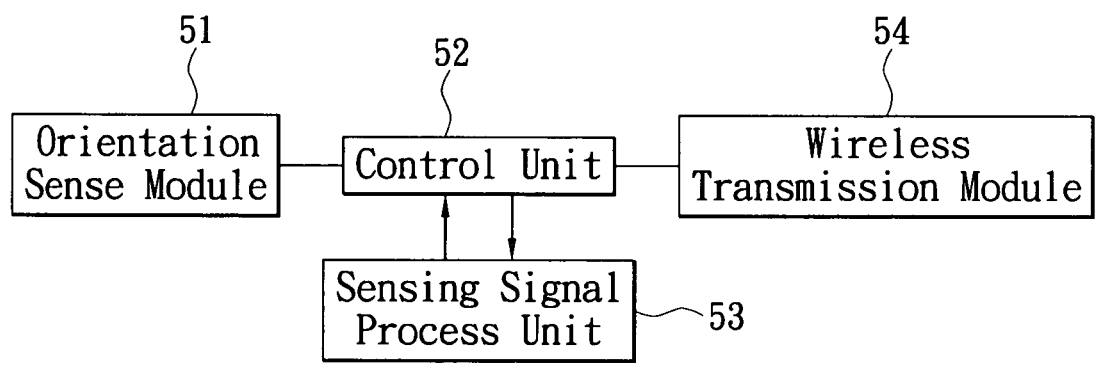
FIG. 7 is a block diagram of an orientation sensing input module of the electronic game controller according to the present invention.

At first, please refer to FIGS. 1-3 illustrating an embodiment of an electronic game controller of the present invention. The electronic game controller includes a front body 1, a rear body 2, a function key group 3, a rotating mechanism 4 and an orientation sensing input module 5 (as shown in FIG. 7). The front body 1 has a longitudinal axis and two lateral axes and includes a first end surface 11, a second end surface 12 and a receiving portion 13. The first end surface 11 is formed on the front portion of the front body 1, and the second end surface 12 is formed on the rear portion of the front body 1 and is non-orthogonal to the longitudinal axis E1 of the front body 1. In the shown embodiment, the plane of second end surface 12 of the front body 1 forms an angle with the plane of upper surface of the front body 1 of more than 45 degrees but less than 90 degrees. The receiving portion 13 may be a groove, a protruding portion or a lateral through-hole and so on, which is formed on a lower portion of the front body 1. In the embodiment, the receiving portion 13 is a groove with a front concave surface 131 and a rear concave surface 132.

The rear body 2 includes a third end surface 21, a fourth end surface 22, a battery container 23 and a cover 24. The third end surface 21 is formed on the front portion of the rear body 2 and the fourth end surface 22 is formed on the rear portion of the rear body 2. The third end surface 21 is non-orthogonal to the longitudinal axis E2 of the rear body 2. In the embodiment, the third end surface 21 of the rear body 2 is an inclined plane and parallel to the second end surface 12 of the front body 1. The battery container 23 is formed close to the fourth end surface 22 in a lower side surface of the rear body 2. The cover 24 is disposed on the battery container 23.

The function key group 3, which is disposed on the front body 1 and/or the rear body 2, includes a first trigger key 31, a second trigger key 32, a direction key 33 and a plurality of function selection keys 34. In the embodiment, the first trigger key 31 is disposed on the rear concave surface 132 of the receiving portion 13 of the front body 1. The second trigger key 32 is disposed close to the third end surface 21 on the rear body 2. The direction key 33 is disposed on the upper surface of the front body 1, close to the second end surface 12. The function selection keys 34 are arranged on the upper surface of the front body 1.

Figure 4:
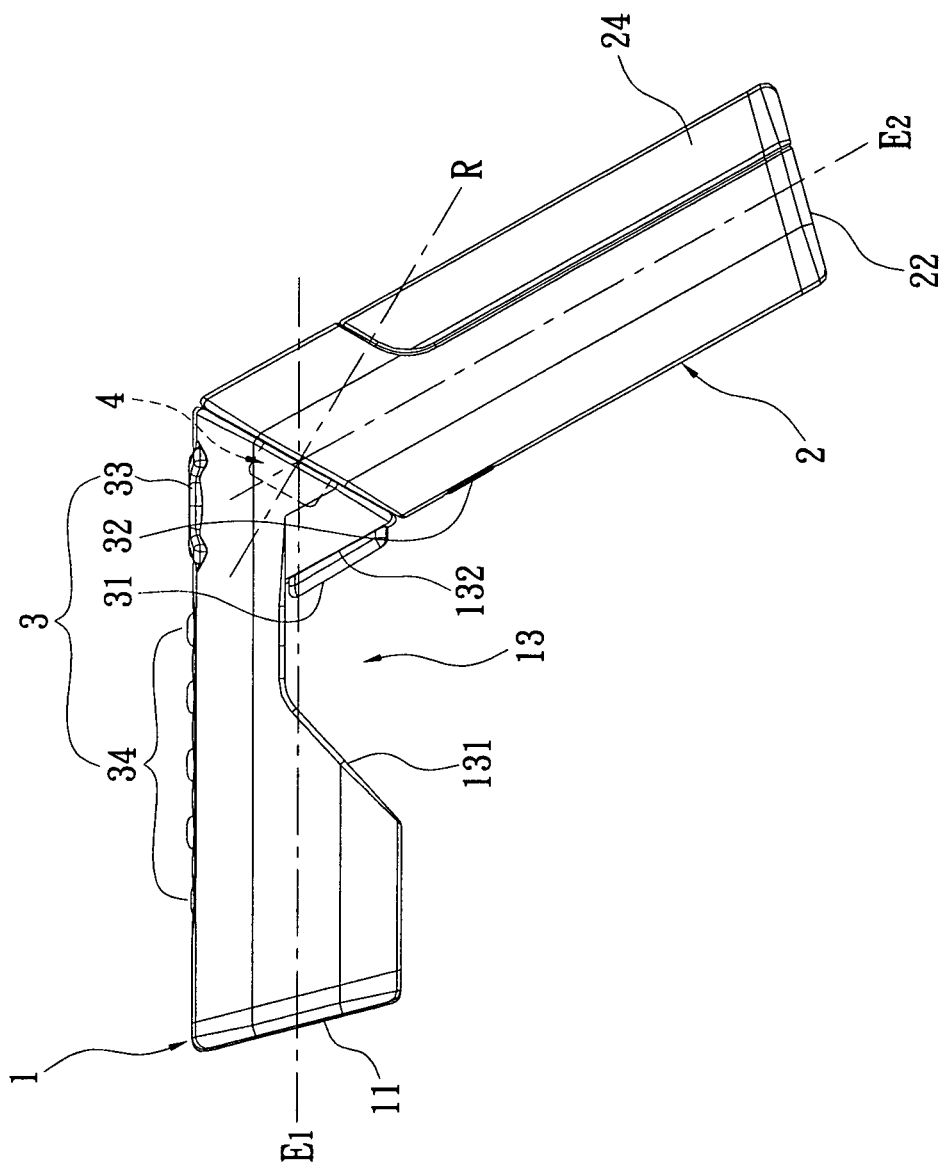
FIG. 4 is a plan view showing that a rear body of the electronic game controller according to the present invention turns 180 degrees relative to a front body thereof.
Figure 5:
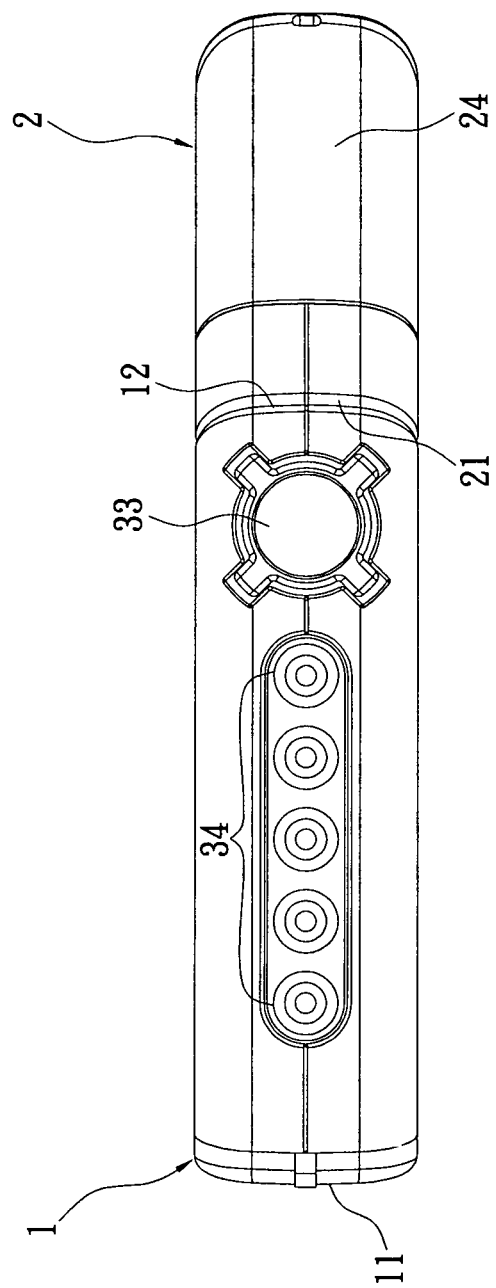
FIG. 5 is a plan view showing that the rear body of the electronic game controller according to the present invention turns 180 degrees relative to the front body thereof, from another angle.
Figure 6:
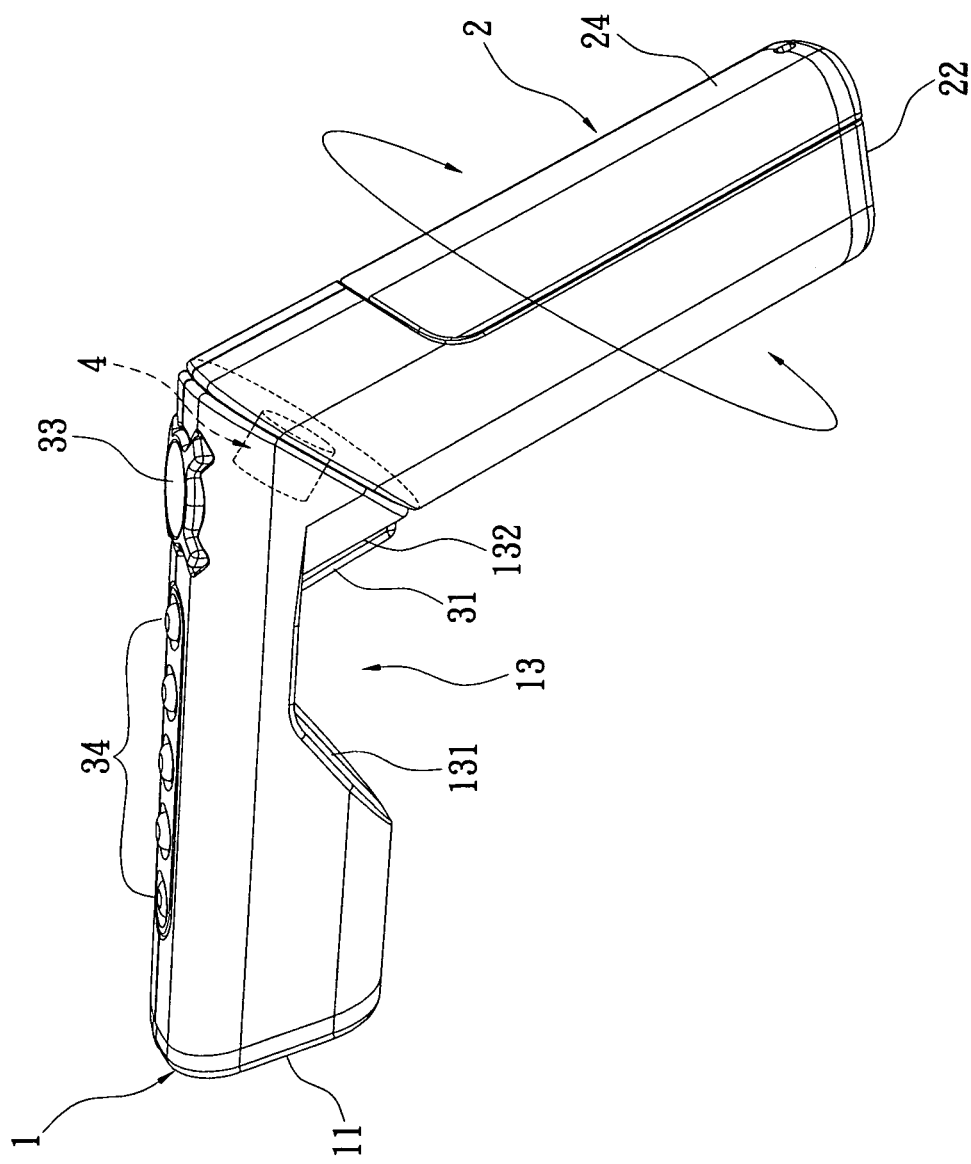
FIG. 6 is a perspective view showing that the rear body of the electronic game controller according to the present invention turns 180 degrees relative to the front body thereof.

The rotating mechanism 4 is connected with the second end surface 12 of the front body 1 and the third end surface 21 of the rear body 2, that is, the front body 1 and the rear body 2 are pivotally connected with each other via the rotating mechanism 4. The direction R of the rotation axis of the rotating mechanism 4 is orthogonal to the second end surface 12 of the front body 1 and the third end surface 21 of the rear body 2. The rotating mechanism 4 is a hinge or a hollow shaft assembly with a rotation or positioning function. However, the present invention doesn't limit the form of the rotating mechanism 4. Accordingly, in the present invention, the rear body 2 can rotate relative to the front body 1 and be positioned via the rotating mechanism 4. Further, the rear body 2 can rotate 360 degrees in a clockwise direction and an anticlockwise direction, as shown in FIGS. 4-6, after the rear body 2 rotates 180 degrees, it can be positioned and combined with the front body 1 to form a handgun-shaped structure.

Please refer to FIG. 7, the orientation sensing input module 5 includes an orientation sensing module 51, a control unit 52, a sensing signal process unit 53 and a wireless transmission module 54. The orientation sensing module 51 may be a micro-inertial sensing module, a magnetic sensing module, an optical sensing module or an ultrasonic sensing module, for sensing movements of users and producing signals. In the embodiment, the orientation sensing module 51 is a micro-inertial sensing module. The control unit 52 is used for collecting the signals sensed by the orientation sensing module 51 and producing corresponding control signals. The sensing signal process unit 53 is used for receiving and processing the control signals produced by the control unit 52, and then producing signals that a game main machine or a computer can accept and transmitting the signals to the control unit 52. The wireless transmission module 54 is used for transmitting the signals that the control unit 52 receives from the sensing signal process unit 53 to a game main machine or a computer. The orientation sensing input module 5 is disposed in the front body 1 or the rear body 2.

When users use the present invention to cooperate with a game main machine or a computer to play interactive electronic games, they can hold the rear body 2 in one hand or two hands and press the first trigger key 31, the second trigger key 32, the direction key 33 or the plurality of function selection keys 34, respectively or simultaneously, by fingers, to input control signals corresponding to the electronic games. Users can also use the orientation sensing input module 5 disposed in the front body 1 or the rear body 2 to sensing, compute, produce and transmit signals via hand movements, thereby controlling special indicators on display pictures for the electronic games for entertainment.

Basing on the embodiment described above, it can be understood that when the rear body 2 doesn't rotate relative to the front body 1 and the longitudinal axes E1, E2 of the front body 1 and the rear body 2 are coincide with each other, the front body 1 and the rear body 2 are form a straight stick; when the rear body 2 rotates 180 degrees in the clockwise direction or the anticlockwise direction, relative to the front body 1, the front body 1 and the rear body 2 form a handgun-shaped structure. Consequently, basing on the rotating mechanism 4, the rear body 2 of the present invention can rotate relative to the front body 1 to form more than two kinds of structures for being held by users. The present invention can adapt for more kinds of interactive electronic games, not only meeting the requirements of human engineering, but also enhancing users' enjoyment of playing electronic games.

What are disclosed above are only the specification and the drawings of the preferred embodiment of the present invention and it is therefore not intended that the present invention be limited to the particular embodiment disclosed. It will be understood by those skilled in the art that various equivalent changes may be made depending on the specification and the drawings of the present invention without departing from the scope of the present invention.

What is claimed is:

1. A game controller that pivots to alternate form, comprising:
   a front body with one longitudinal axis and two lateral axes, including a first end surface and a second end surface, the second end surface being non-orthogonal to the longitudinal axis of the front body;
   a rear body with one longitudinal axis and two lateral axes, including a third end surface and a fourth end surface, the third end surface being an inclined plane parallel and contacted to the second end surface of the front body and non-orthogonal to the longitudinal axis of the rear body;
   a plurality of function keys, disposed on the front body and the rear body; and
   a rotating mechanism, connected with the second end surface of the front body and the third end surface of the rear body, wherein the front body and the second body are pivotally connected with each other via the rotating mechanism, wherein the rotating mechanism has a rotation axis orthogonal to the second end surface of the front body and the third end surface of the rear body, whereby the rear body is pivoted 180 degrees relative to the front body along the rotation axis of the rotating mechanism and be positioned by the rotating mechanism to alternate form in the shape of a hand-gun during a game playing operating state.

2. The game controller as claimed in claim 1, wherein the front body has a receiving portion-concaved from a lower portion thereof to form a groove, and wherein at least one of the function keys is disposed on the receiving portion, the groove has a front concave surface and a rear concave surface, and forming an amount of spacing to accommodate a first trigger key, the trigger key located in the groove on the rear concave surface.

3. The game controller as claimed in claim 1, wherein the rear body has a battery container foil ied in one side surface thereof and a cover disposed on the battery container.

4. The game controller as claimed in claim 1, wherein the front body has an orientation sensing input module disposed therein, which includes an orientation sensing module, a control unit, a sensing signal processing unit and a wireless transmission module.

5. The game controller as claimed in claim 4, wherein the orientation sensing module is an optical sensing module or an ultrasonic sensing module.

6. The game controller as claimed in claim 1, wherein the rear body has an orientation sensing input module disposed therein, which includes an orientation sensing module, a control unit, a sensing signal process unit and a wireless transmission module.

7. The game controller as claimed in claim 6, wherein the orientation sensing module is an optical sensing module or an ultrasonic sensing module.

8. The game controller as claimed in claim 1, wherein one of the function keys is disposed on a bottom surface of the front body, wherein another one of the function keys is disposed on a top surface of the rear body and adjacent to the third end surface, wherein an obtuse-angle is formed between the rear body and the front body, the function key on the top surface of the rear body is rotated to align with the function key on the bottom surface of the front body.

9. The game controller as claimed in claim 1, wherein the plane of the second end surface of the front body is formed with an angle with the plane of upper surface of the front body, wherein the angle is larger than 45 degrees and less than 90 degrees.

10. The game controller as claimed in claim 1, wherein the rear body is pivotably connected to the front body in a clockwise and anticlockwise direction along the rotation axis of the rotating mechanism.

* * * * *